United States Patent
Church et al.

(10) Patent No.: US 11,115,696 B2
(45) Date of Patent: Sep. 7, 2021

(54) PROGRAMMATIC INGESTION AND STB DELIVERY IN AD AUCTION ENVIRONMENTS

(71) Applicant: Beachfront Media LLC, Ormond Beach, FL (US)

(72) Inventors: Daniel Church, Long Island City, NY (US); Richard Shea, St. Augustine, FL (US); Marshall Wong, New York, NY (US)

(73) Assignee: Beachfront Media LLC, Ormond Beach, FL (US)

( * ) Notice: Subject to any disclaimer, the term of this patent is extended or adjusted under 35 U.S.C. 154(b) by 0 days.

(21) Appl. No.: 16/508,270

(22) Filed: Jul. 10, 2019

(65) Prior Publication Data

US 2021/0014549 A1    Jan. 14, 2021

(51) Int. Cl.
*H04N 21/2543*    (2011.01)
*H04N 21/234*    (2011.01)
(Continued)

(52) U.S. Cl.
CPC ...... *H04N 21/25435* (2013.01); *H04H 60/21* (2013.01); *H04H 60/40* (2013.01); *H04N 21/23424* (2013.01); *H04N 21/234309* (2013.01); *H04N 21/440218* (2013.01); *H04N 21/812* (2013.01)

(58) Field of Classification Search
CPC ......... H04N 21/25435; H04N 21/2547; H04N 21/234309; H04N 21/440218
See application file for complete search history.

(56) References Cited

U.S. PATENT DOCUMENTS

2007/0288953 A1\* 12/2007 Sheeman ............... H04H 20/10
                                                          725/34
2008/0015933 A1\* 1/2008 McKenna .......... G06Q 30/0264
                                                          705/14.61
(Continued)

FOREIGN PATENT DOCUMENTS

WO    WO-2008013707 A2 \*  1/2008  ........... H04N 21/812
WO    WO-2014142758 A1 \*  9/2014  ......... H04N 21/2668

*Primary Examiner* — Robert J Hance
(74) *Attorney, Agent, or Firm* — Haynes Beffel & Wolfeld LLP; Ernest J. Beffel, Jr.

(57) ABSTRACT

The disclosed technology teaches streamlining use of Society of Cable Telecommunications Engineers (SCTE) 130 framework for delivery of addressable advertising, via a campaign management delegate system that carries out a method that includes receiving an ad management service placement request from a broadcast cable provider for ad insertion into a program and conducting real time bidding for ad insertion during the program. The disclosed method also includes accepting new content provided by a successful bidder, after receiving the placement request and automatically formatting the new content, and uploading the new content to the broadcast cable provider in time for playback with content that prompted the placement request. The method includes responding to the placement request with a placement response that includes a VMAP as reference to the new content. New content can also be uploaded to a CIS managed by the cable provider or provided on behalf of the provider.

19 Claims, 15 Drawing Sheets

(51) Int. Cl.
*H04H 60/40* (2008.01)
*H04H 60/21* (2008.01)
*H04N 21/81* (2011.01)
*H04N 21/2343* (2011.01)
*H04N 21/4402* (2011.01)

(56) References Cited

U.S. PATENT DOCUMENTS

| | | | | |
|---|---|---|---|---|
| 2008/0127249 | A1* | 5/2008 | Cruice | H04N 7/163 725/34 |
| 2008/0250447 | A1* | 10/2008 | Rowe | H04N 21/4667 725/32 |
| 2008/0319840 | A1* | 12/2008 | Li | G06Q 30/02 705/14.47 |
| 2010/0138290 | A1* | 6/2010 | Zschocke | G06Q 30/0275 705/14.41 |
| 2011/0088061 | A1* | 4/2011 | Rowe | H04H 20/106 725/35 |
| 2011/0185378 | A1* | 7/2011 | Johnson | H04N 21/4331 725/25 |
| 2014/0026153 | A1* | 1/2014 | Sorlander | G06Q 10/02 725/5 |
| 2015/0019629 | A1* | 1/2015 | Giladi | H04N 21/26258 709/203 |
| 2016/0191972 | A1* | 6/2016 | Rao | H04N 21/26225 725/34 |
| 2016/0295299 | A1* | 10/2016 | Kang | H04N 21/458 |
| 2017/0070789 | A1* | 3/2017 | Liassides | H04N 21/44204 |
| 2019/0349643 | A1* | 11/2019 | Hall | H04N 21/2187 |

* cited by examiner

```
<ADI>
  <Metadata>
    <AMS Asset_Name="AAAA5be4ed76_Package_2919980" Provider="ADSTORONE_ADS" Product="ADTV" Version_Major="1" Version_Minor="10002" Description="AAAA5be4ed76" Creation_Date="2018-11-09" Provider_ID="adstorone.net" Asset_ID="ADSP18110902312745O4" Asset_Class="package" Verb="DELETE"/>
    <App_Data App="ADTV" Name="Provider_Content_Tier" Value="COX"/>
    <App_Data App="ADTV" Name="Provider_Content_Tier" Value="TIMEWARNER"/>
    <App_Data App="ADTV" Name="Provider_Content_Tier" Value="CDN"/>
    <App_Data App="ADTV" Name="Provider_Content_Tier" Value="FTR_ADSTOR"/>
    <App_Data App="ADTV" Name="Provider_Content_Tier" Value="CHARTER_LA"/>
    <App_Data App="ADTV" Name="Metadata_Spec_Version" Value="CableLabsVOD1.1"/>
  </Metadata>
```

FIG. 3

```
<Asset>
<Metadata>
<AMS Asset_Name="AAAA5be4ed76_Title_2919980" Provider="ADSTORONE_ADS" Product="ADTV" Version_Major="1" Version_Minor="4" Description="AAAA5be4ed76" Creation_Date="2018-11-09" Provider_ID="adstorone.net" Asset_ID="ADST181109023127450A" Asset_Class="title" Verb="DELETE"/>
<App_Data App="ADTV" Name="Type" Value="title"/>
<App_Data App="ADTV" Name="Destination_Platforms" Value="VODHD,VODSD"/>
<App_Data App="ADTV" Name="Licensing_Window_Start" Value="2018-11-09T00:00:01"/>
<App_Data App="ADTV" Name="Licensing_Window_End" Value="2019-05-08T23:59:59"/>
<App_Data App="ADTV" Name="MSV_Association" Value="ADSP180123055309174A"/>
<App_Data App="ADTV" Name="Alt_Code" Value="ADSP180123055309174A"/>
<App_Data App="ADTV" Name="IsSubscription" Value="N"/>
<App_Data App="ADTV" Name="Summary_Long" Value="CCH Creative"/>
<App_Data App="ADTV" Name="Summary_Medium" Value="CCH Creative"/>
<App_Data App="ADTV" Name="Category_Display" Value="Help & Services/AdCopy"/>
<App_Data App="ADTV" Name="Content_Type" Value="MOV"/>
<App_Data App="ADTV" Name="Genre" Value="Advertising"/>
<App_Data App="ADTV" Name="Genre_Display" Value="Advertising"/>
<App_Data App="ADTV" Name="HD_Rights" Value="N"/>
<App_Data App="ADTV" Name="Purchase" Value="N"/>
<App_Data App="ADTV" Name="Rental" Value="N"/>
<App_Data App="ADTV" Name="Suggested_Price" Value="0.00"/>
<App_Data App="ADTV" Name="MPEG4" Value="N"/>
<App_Data App="ADTV" Name="Title_Sort_Name" Value="CCH Creative"/>
<App_Data App="ADTV" Name="Title_Brief" Value="CCH Creative"/>
<App_Data App="ADTV" Name="Title" Value="CCH Creative"/>
...
```

404 — <Asset>
414 — <Metadata>
425 — AMS line
428 — Destination_Platforms line
446 — Summary_Long line

FIG. 4A

```xml
<App_Data App="ADTV" Name="Summary_Short" Value="CCH Creative"/>
<App_Data App="ADTV" Name="Rating" Value="G"/>                                      — 434
<App_Data App="ADTV" Name="Closed_Captioning" Value="N"/>
<App_Data App="ADTV" Name="Run_Time" Value="00:00:14"/>
<App_Data App="ADTV" Name="Display_Run_Time" Value="00:01"/>
<App_Data App="ADTV" Name="Year" Value="2018"/>
<App_Data App="ADTV" Name="Category" Value="Help & Services/AdCopy"/>               — 456
<App_Data App="ADTV" Name="Billing_ID" Value="00000"/>
<App_Data App="ADTV" Name="Preview_Period" Value="0"/>
<App_Data App="ADTV" Name="Display_As_New" Value="7"/>
<App_Data App="ADTV" Name="Display_As_Last_Chance" Value="7"/>
<App_Data App="ADTV" Name="Provider_QA_Contact" Value="AdStor_Support@comcast.com"/>
<App_Data App="ADTV" Name="Maximum_Viewing_Length" Value="01:00:00"/>
<App_Data App="ADTV" Name="FTR_Tags" Value=""/>
<App_Data App="ADTV" Name="HD_Purchase_Price" Value=""/>
<App_Data App="ADTV" Name="HD_Rental_Price" Value=""/>
<App_Data App="ADTV" Name="SD_Purchase_Price" Value=""/>
<App_Data App="ADTV" Name="SD_Rental_Price" Value=""/>
</Metadata>
</Asset>
</ADI>
```

FIG. 4B

```
1  <vmap:VMAP xmlns:vmap="http://www.iab.net/vmap-1.0" version="1.0">                              ──── 904
2  <vmap:AdBreak breakId="jwLOcJRuEem8sQI7nk5uXQ==" breakType="linear">
3  <vmap:AdSource allowMultipleAds="true" followRedirects="true" id="1">
4  <vmap:VASTAdData>
5  <VAST version="2.0">    ──── 914
6  <Ad id="21252">
7  <InLine>
8  <AdSystem version="2.0">Beachfront Marketplace Ad</AdSystem>
9  <AdTitle>
10 <![CDATA[ Ad Title ]]>
11 </AdTitle>
12 <Impression id="Io-1">
13 <![CDATA[ http://stb.bfmio.com/track ]]>
14 </Impression>
15 <Impression id="Io-2">
16 <![CDATA[ http://stb.bfmio.com/track ]]>
17 </Impression>
18 <Creatives>
19 <Creative id="5611">
20 <Linear>                                                        ──── 964
21 <Duration>00:00:30</Duration>
22 <TrackingEvents>
23 <Tracking event="start">
24 <![CDATA[ http://stb.bfmio.com/track ]]>
25 </Tracking>
26 <Tracking event="firstQuartile">
27 <![CDATA[ http://stb.bfmio.com/track ]]>
28 </Tracking>
29 <Tracking event="midpoint">
30 <![CDATA[ http://stb.bfmio.com/track ]]>
31 </Tracking>
...
```

FIG. 9A

FIG. 9B

```
...
32 <Tracking event="thirdQuartile">
33 <![CDATA[ http://stb.bfmio.com/track ]]>
34 </Tracking>
35 <Tracking event="complete">
36 <![CDATA[ http://stb.bfmio.com/track ]]>
37 </Tracking>
38 <Tracking event="close">
39 <![CDATA[
40 http://stb.bfmio.com/track<![CDATA[http://stb.bfmio.com/track
41 ]]>
42 </Tracking>
43 </TrackingEvents>
44 <VideoClicks>
45 <ClickThrough id="5611"/>
46 <ClickTracking>
47 <![CDATA[
48 http://stb.bfmio.com/track<![CDATA[http://stb.bfmio.com/track
49 ]]>
50 </ClickTracking>
51 </VideoClicks>
52 <MediaFiles>
53 <MediaFile delivery="progressive" type="external/vod-asset-identifier" width="1920" height="1080">
54 <![CDATA[ ASSET_PATH ]]>
55 </MediaFile>
56 <MediaFile delivery="progressive" type="external/vod-asset-identifier" width="640" height="480">
57 <![CDATA[ ASSET_PATH ]]>
58 </MediaFile>
59 </MediaFiles>
60 </Linear>
...
```

968

```
61 </Creatives> 404
62 </Creatives>
63 </InLine>
64 </Ad>
65 </VAST>
66 </vmap:VASTAdData>
67 </vmap:AdSource>
68 </vmap:AdBreak>
69 <vmap:AdBreak breakId="jwLOcpRuEem8sQl7nk5uXQ==" breakType="linear" timeOffset="00:11:22">
70 <vmap:AdSource allowMultipleAds="true" followRedirects="true" id="2">
71 <vmap:VASTAdData>
72 <VAST version="2.0"/>
73 </vmap:VASTAdData>
74 </vmap:AdSource>
75 </vmap:AdBreak>
76 <vmap:AdBreak breakId="jwLOc5RuEem8sQl7nk5uXQ==" breakType="linear" timeOffset="00:17:57">
77 <vmap:AdSource allowMultipleAds="true" followRedirects="true" id="3">
78 <vmap:VASTAdData>
79 <VAST version="2.0"/>
80 </vmap:VASTAdData>
81 </vmap:AdSource>
82 </vmap:AdBreak>
```

```
 83 <vmap:AdBreak breakId="jwL1gJRuEem8sQl7nk5uXQ==" breakType="linear" timeOffset="00:25:52">
 84 <vmap:AdSource allowMultipleAds="true" followRedirects="true" id="4">
 85 <vmap:VASTAdData>
 86 <VAST version="2.0">  ╱── 943
 87 <Ad id="21242">
 88 <InLine>
 89 <AdSystem version="2.0">Beachfront Marketplace Ad</AdSystem>
 90 <AdTitle>
 91 <![CDATA[ Ad Title ]]>
 92 </AdTitle>
 93 <Impression id="io-1">
 94 <![CDATA[ http://stb.bfmio.com/track ]]>
 95 </Impression>
 96 <Impression id="io-2">
 97 <![CDATA[ http://stb.bfmio.com/track ]]>
 98 </Impression>
 99 <Creatives>
100 <Creative id="5611">
101 <Linear>
102 <Duration>00:00:30</Duration>
103 <TrackingEvents>
104 <Tracking event="start">
105 <![CDATA[ http://stb.bfmio.com/track ]]>
106 </Tracking>
107 <Tracking event="firstQuartile">
108 <![CDATA[ http://stb.bfmio.com/track ]]>
109 </Tracking>
110 <Tracking event="midpoint">
111 <![CDATA[ http://stb.bfmio.com/track ]]>
112 </Tracking>
113 <Tracking event="thirdQuartile">
114 <![CDATA[ http://stb.bfmio.com/track ]]>
115 </Tracking>
```

FIG. 9D

```
116 <Tracking event="complete">
117 <![CDATA[ http://stb.bfmio.com/track ]]>
118 </Tracking>
119 <Tracking event="close">
120 <![CDATA[
121 http://stb.bfmio.com/track<![CDATA[http://stb.bfmio.com/track
122 ]]>
123 </Tracking>
124 </TrackingEvents>
125 <VideoClicks>
125 <VideoClicks>
126 <ClickThrough id="5611"/>
127 <ClickTracking>
128 <![CDATA[ http://stb.bfmio.com/track ]]>
129 </ClickTracking>
130 </VideoClicks>
131 <MediaFiles>
132 <MediaFile delivery="progressive" type="external/vod-asset-identifier" width="1920" height="1080">
133 <![CDATA[ ASSET_PATH ]]>
134 </MediaFile>
135 <MediaFile delivery="progressive" type="external/vod-asset-identifier" width="640" height="480">
136 <![CDATA[ ASSET_PATH ]]>
137 </MediaFile>
138 </MediaFiles>
139 </Linear>
140 </Creative>
141 </Creatives>
142 </InLine>
143 </Ad>
144 </VAST>
145 </vmap:VASTAdData>
146 </vmap:AdSource>
147 </vmap:AdBreak>
148 </vmap:VMAP>
```

FIG. 9E

PROGRAMMATIC INGESTION AND STB DELIVERY IN AD AUCTION ENVIRONMENTS

INCORPORATIONS

The following materials, SCTE 130-1 2013: Digital Program Insertion—Advertising Systems Interfaces Part 1—Overview; SCTE 130-2 2014: Digital Program Insertion—Advertising Systems Interfaces Part 2—Core Data Elements; SCTE 130-3 2013: Digital Program Insertion—Advertising Systems Interfaces Part 3—Ad Management Service (ADM) Interface; SCTE 130-4 2015: Digital Program Insertion—Advertising Systems Interfaces Part 4—Content Information Service; SCTE 130-5 2016: Digital Program Insertion—Advertising Systems Interfaces Part 5—Placement Opportunity Information Service; and SCTE 130-6 2013: Digital Program Insertion—Advertising Systems Interfaces Part 6—Subscriber Information Service are incorporated by reference for all purposes as if fully set forth herein.

FIELD OF THE TECHNOLOGY DISCLOSED

The technology disclosed relates generally to systems and methods for preparing advertising for insertion in entertainment content delivered by broadcast cable providers, including systems and methods compatible with versions SCTE 130 in effect in July 2019. The technology disclosed implements formatting and uploading ads (aka creative content) to a content information system operated by or on behalf of a broadcast cable provider, coupled with processing placement requests. The technology disclosed is so much faster and better integrated and streamlined than prior SCTE 130 systems that it can ingest, format and upload new content after a successful real time bid for placement, in time for showing at the specified ad slot in the entertainment content being delivered by the cable content that triggered the placement request.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

In the age of the rapidly expanding video ecosystem, consumers expect to be able to watch whatever they want, whenever, wherever and however they want. Traditional linear TV provides quality content for viewers. Meanwhile a connected TV (CTV) is connected to the internet. Over-the-top (OTT) content can be streamed through applications over the public internet onto a tablet, mobile device, laptop or connected TV for consumption by viewers. OTT provides a dynamic environment in which viewers can experience content on their own terms.

Advertisers want to reach specific viewing audiences. Addressable advertising offers the ability to show different ads to different households while they are watching the same program. Addressability is the process of customizing marketing messages to match the personal lifecycle needs of specific consumers at a specific point in their purchase cycle, thereby optimizing relevance.

Content distributors want to maximize the value of the ad inventory they sell. Retargeting, also referred to as remarketing, is an early example of addressable marketing in the digital space. With the help of addressable advertising, advertisers can move beyond large-scale traditional TV ad buys, to focus on relevance and impact.

SCTE-130 is a standard from the Society of Cable Telecommunications Engineers (SCTE) for a unified platform framework for addressable advertising. The SCTE-130 standard consists of a set of XML-based protocols which will work in traditional cable deployments such as setup boxes, for both linear and video on demand (VOD) programming.

An opportunity arises to streamline use of the SCTE 130 framework for delivery of addressable advertising.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3 shows an example placement request from a broadcast cable provider for ad insertion into a program, in ad definition interface format.

FIG. 4A and FIG. 4B list an example metadata file in ADI format for a creative asset.

FIG. 9A, FIG. 9B, FIG. 9C, FIG. 9D and FIG. 9E list an example VMAP that includes multiple VASTs.

DETAILED DESCRIPTION

Figure 1:
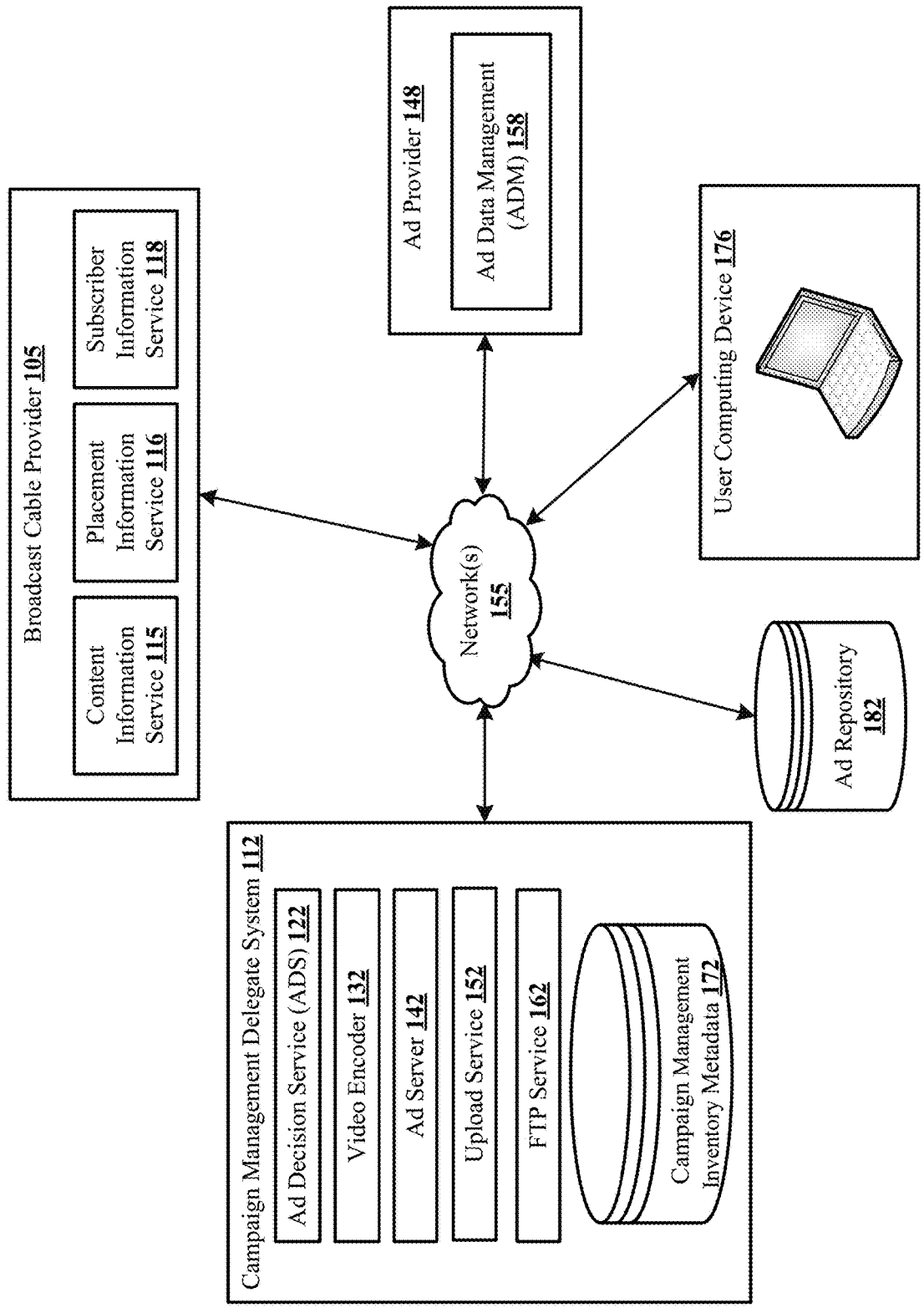
FIG. 1 illustrates an architectural level schematic of a system for streamlining use of the SCTE 130 framework for delivery of addressable advertising.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

As the nature of TV audiences keeps shifting, broadcaster advertising needs also shift. An important area for broadcasters to grow their capabilities is with set-top-box (STB) video-on-demand (VOD) inventory, which is among the highest value inventory in media. Advertisers want an ad service to deliver their ads in a way that increases sales. A biddable sales channel for advertising can lead to an increase in demand for STB VOD inventory. Thus a demand exists for programmatic advertising sales for managed equipment such as customer premise equipment (CPE) and STB VOD inventory.

Multichannel video programming distributors (MVPD) deliver to viewers a wide variety of TV channels and VOD inventory. MVPD are also referred to as cable or satellite or fiber optic system (FiOS) TV service, with examples such as Comcast, DirecTV, DISH, Cox Communications and Frontier. The delivery of VOD inventory by MVPD creates a micro-targeting opportunity known as addressable TV.

Programmatic advertising is the automated buying and selling of online advertising and it utilizes targeting tactics to segment audiences, using data, so that advertisers only pay for ads delivered to the right people at the right time. Addressable TV uses programmatic advertising technology and advanced audience segmentation to deliver specific video ads at a household level, with on-demand entertainment programming accessed via a set-top box. Real-time bidding (RTB) refers to the buying and selling of online ad impressions through real-time auctions. RTB is a means by which advertising inventory is bought and sold on a per-impression basis, via real time programmatic auction.

Events motivate the demand for a short lead time for delivering ads, such as a retailer placing ads for selling fans and air conditioning units in response to an unseasonable heat wave or selling space heaters during an unexpected cold snap. In another case, auto dealers want to clear out specific inventory at the end of the month. In a third example, unexpected disease outbreaks or unexplained deaths can motivate the need for just-in-time advertising such as opportunistic tourism promotion, responsive to negative publicity about competing destinations.

The disclosed technology enables real time programmatic advertising sales for CPE and STB VOD inventory delivered by MVPD. By streamlining use of the SCTE 130 framework for delivery of addressable advertising, MVPD can execute dynamic ad insertion in the VOD environment in real-time, enabling advertisers to buy audiences instead of programs. The disclosed technology with delegated campaign management enables the buying and targeting of addressable advertising to specific viewers of VOD inventory, and supports programmatic advertisers to make their ad creatives directly available on demand. The disclosed technology can also enable the collection of sampled information for audiences of programmatically placed ad content.

An example system for streamlining use of SCTE 130 framework for delivery of addressable advertising is described next.

Architecture

FIG. 1 shows an architectural level schematic of a system 100 for streamlining use of the SCTE 130 framework for delivery of addressable advertising. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes broadcast cable provider 105 such as Comcast, DirecTV, DISH, Cox Communications and Frontier, campaign management delegate system 112, ad provider 148, ad repository 182 and user computing device 176.

Broadcast cable provider 105 includes content information service (CIS) 115 that manages metadata that describes the available assets, both advertising and entertainment, for the provider. CIS 115 allows querying of content and its existence. In one example, a CIS query can request the content belonging to a particular content provider. In another query example, CIS can request the content from the content distributor, video server, etc. Broadcast cable provider 105 also includes placement opportunity information service (POIS) 116 that manages the descriptions of placement opportunities in the entertainment assets, including formats and ad maps, and specifies ownership of positions. Broadcast cable provider 105 further includes subscriber information service (SIS) 118 that manages per-subscriber information relevant to ad placement decisions, with demographic, behavioral and other metadata about subscribers. More than one broadcast cable provider 105 can make use of the disclosed streamlining use of the SCTE 130 framework for delivery of addressable advertising, in some implementations. Three parts of SCTE 130 specify protocols for CIS 115: SCTE 130-4 2011: Digital Program Insertion—Advertising Systems Interfaces Part 4—Content Information Service; POIS 116: SCTE 130-5 2010: Digital Program Insertion—Advertising Systems Interfaces Part 5—Placement Opportunity Information Service; and SIS 118: SCTE 130-6 2010: Digital Program Insertion—Advertising Systems Interfaces Part 6—Subscriber Information Service. These three SCTE 130 protocols are incorporated herein in full by reference.

Continuing the description of system 100, campaign management delegate system 112 includes ad decision service (ADS) 122, video encoder 132, ad server 142, upload service 152, FTP service 162 and campaign management metadata 172. Ad server 142 conducts real time bidding for ad insertion during the non-advertising content, also referred to as entertainment or a program. Ad server 142 accepts new content provided by a successful bidder, responsive to the placement request and bidding, determining what advertising content needs to be included with the program, in relation to time of day and type of content and in consideration of broadcast cable provider metadata, which includes advertising needs such as subscriber data and ad break setup for specific content. VOD service provider metadata typically includes the timing for each break in the entertainment, how many breaks are available and what type and how many ads are allowed in each break. Ad server 142 generates the VMAP response with the results of the auction. Video encoder 132 automatically formats the new content, encoding selected ads in standard definition (SD) format and HD format with 1080p resolution. In another implementation, a different encoding format could be utilized to match an emerging technology that requires an additional video resolution. Ad server 142 looks up, in campaign management metadata 172, using the ad definition interface (ADI) metadata for the entertainment asset, typically a TV show or movie, to determine whether an ad asset is ready to serve to broadcast cable provider 105. Upload service 152 uploads a VMAP to broadcast cable provider 105 and FTP service 162 sends the creative asset video file, the ad, to broadcast cable provider 105 in time for playback with content that prompted the placement request.

Further describing system 100, ad provider 148 includes ad data management 158 which originates messages articulating ad insertion, also referred to as ad placement, opportunities. Ad repository 182 stores campaign inventory, also referred to as creatives, for use by campaign management delegate system 112 to respond to placement requests by broadcast cable provider 105. Ad provider 148 can represent multiple different ad organizations that own ads and want to buy opportunities to air their ads during entertainment content delivered as VOD to STB. Ad data management 158 queries ADS 122 to determine what ads are appropriate to place inside the content. System 100 also includes network(s) 155 and user computing device 176 that includes a user interface for viewing previews in a creative review system, which is described in detail later.

In the interconnection of the elements of system 100, network 155 couples broadcast cable provider 105, campaign management delegate system 112 and ad provider 148 in communication, along with user computing device 176 and ad repository 182. The communication path can be point-to-point over public and/or private networks. Communication can occur over a variety of networks, e.g. private networks, VPN, MPLS circuit, or Internet, and can use appropriate application program interfaces (APIs) and data interchange formats, typically XML as described later relative to a message flow diagram of FIG. 3. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

Campaign management metadata 172 stores metadata information from one or more broadcast cable providers and one or more ad providers into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs. The assembled metadata can stored in a semi-structured data format like JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. Ad repository 182 utilizes Amazon Simple Storage Service (S3), an object storage service, in one implementation. A different storage service can be used to store video creatives in a different implementation.

The components of FIG. 1 are implemented by software running on varying types of computing devices. Example devices are a workstation, a server, a computing cluster, a blade server, and a server farm, or any other data processing system or computing device. The broadcast cable provider 105, campaign management delegate system 112 and ad provider 148 can be communicably coupled to the databases via a different network connection. For example, broadcast cable provider 105 can be coupled via network(s) 155 (that is, the Internet) and campaign management delegate system 112 can be coupled to ad repository 182 via a direct network link.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

The Interactive Advertising Bureau (IAB) is comprised of more than 500 leading media and technology companies that are responsible for selling 86% of online advertising in the United States. A video ad serving template (VAST) is a template for structuring ad tags that serve ads, using an XML schema to transfer the metadata about an ad from an ad server to a media player. The IAB digital video multiple ad playlist (VMAP) is an XML template that video content owners and ad networks can use to schedule multiple ad insertions from a single tag. A VMAP is a collection of VASTs that video content owners use to describe the structure for ad inventory insertion, usable for real-time bidding (RTB). That is, ads are one-to-one for a single viewer for a single VOD session, mapping ads to an entertainment video for a user of a MVPD in a single household. In another implementation, the VMAP can be utilized to describe the structure for ad inventory insertion for regularly scheduled programming. VMAP defines the ad breaks within content, including the timing for each break, how many breaks are available, and what type of ads and how many are allowed in each break.

Figure 2:
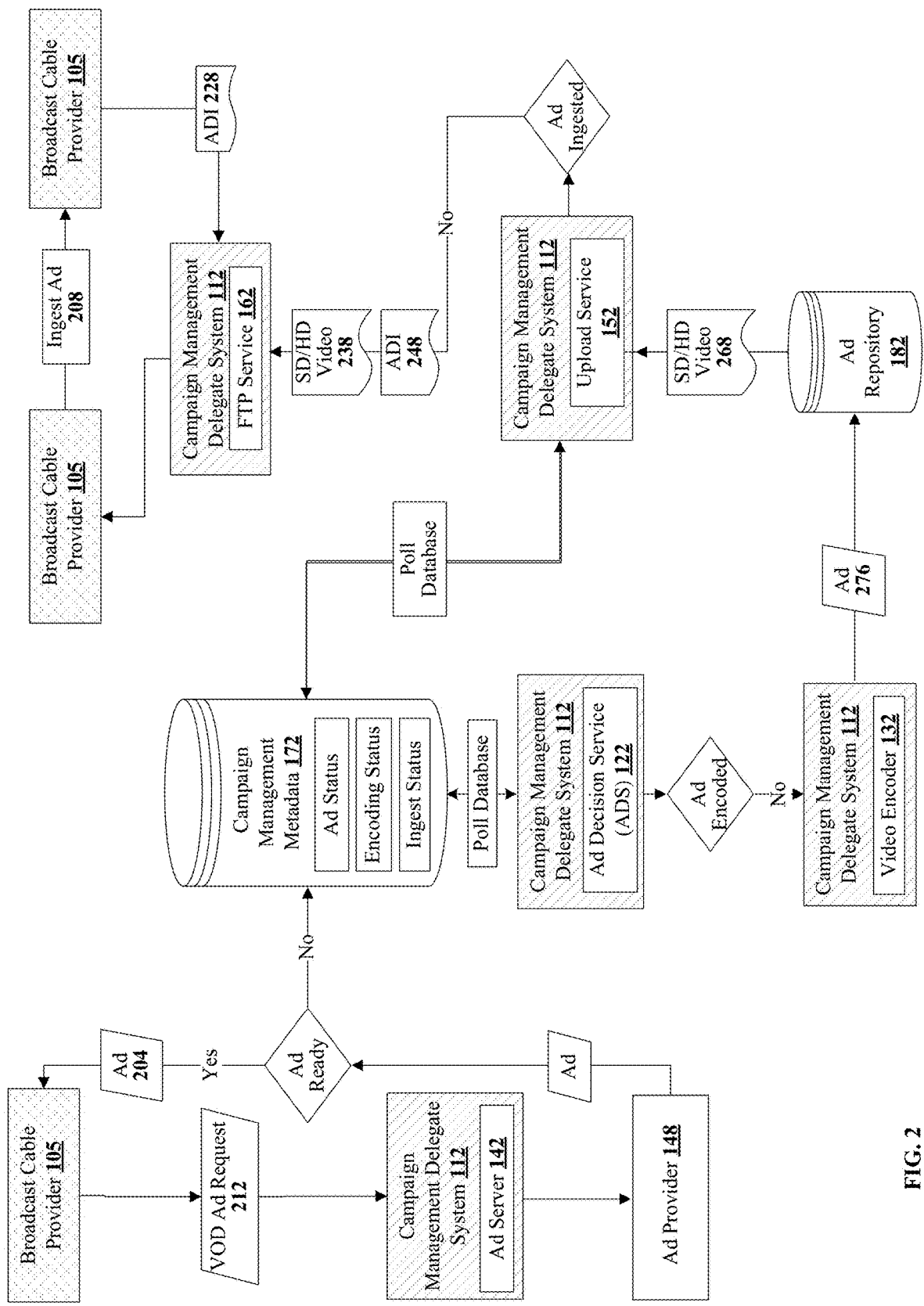
FIG. 2 shows a functional workflow overview for streamlining use of the SCTE 130 framework for delivery of addressable advertising.

FIG. 2 shows a functional workflow overview for streamlining use of the SCTE 130 framework for delivery of addressable advertising. When a viewer turns on their VOD STB and selects play to request specific entertainment, an ad placement request is triggered. Broadcast cable provider 105 sends a VOD ad placement request 212 to campaign management delegate system 112 that processes the ad management service (AMS) placement request for ad insertion into the program. In one example, the VOD service provider metadata includes the timing for each break in the entertainment, how many breaks are available and what type and how many ads are allowed in each break.

Continuing with the overview of the workflow, ad server 142 looks up the metadata for the entertainment asset in campaign management metadata 172 and uses the data for targeting a programmatic auction, also referred to as ad bidding, to match the entertainment. Ad bidding considerations include the status of ads that will potentially fill an ad slot. Previously negotiated contracts "guarantee" that if a guaranteed contract holder bids for a particular ad slot, they are awarded a first look—any time they bid they get to place their ad in that slot. Preferred ad suppliers bid among themselves if no guaranteed ad has "won" the slot. Ads from a 'guaranteed' ad campaign are not required to outbid bidders in a 'preferred' bidding category. Backfill ads from the MVPD are added to the VMAP in cases in which no ad is returned by guaranteed or preferred bidders, to ensure that all ad slots are filled.

Further continuing with the description of FIG. 2, Ad server 142 conducts real time bidding for ad insertion during a program, also referred to as non-advertising content. The real time auction determines the creative that ad data management (ADM) 158 will return as the "winning" creative from at least one ad buyer, taking into account genre of the entertainment, ratings, targeting, etc. Campaign management delegate system 112 accepts new content provided by a successful bidder, responsive to the placement request. Protocol for communication between ADM 158 and ADS 122 is described in detail in SCTE 130-3 2013: Digital Program Insertion—Advertising Systems Interfaces Part 3—Ad Management Service (ADM) Interface, which is incorporated herein in full, by reference.

Continuing the description of the workflow overview of FIG. 2, campaign management delegate system 112 responds to the placement request with a placement response that includes reference to the new content. The ad placement is specified in VAST files in VMAP structure for delivery to the MVPD. For the case in which an ad is not ready to deliver, ad decision service 122 polls the ad status stored in campaign management metadata 172. If the ad is not yet stored, campaign management delegate system 112 creates and adds a record to campaign management metadata 172. Ad encoder 132 encodes the ad and stores the encoded ad 276 in ad repository 182, and updates the status of the ad to "encoded" and stores the ad repository 182 location of the ad in campaign management metadata 172. The VMAP and encoded SD/HD video 268 are made available to upload service 152. When the ad 204 is ready for delivery, campaign management delegate system 112 serves the ad 204 and VMAP to broadcast cable provider 105. FTP service 162 sends the ADI 248 for the file and the SD/HD video 238 to broadcast cable provider 105, which ingests the ad. Broadcast cable provider 105 distributes the ad and VMAP within their system and updates the ADI to reflect the ingest status 245, marking the ad as active, also referred to as "hot", so ready to be delivered for viewing in real time. Campaign management delegate system 112 captures the status of the updated ADI 228 and updates campaign management metadata 172.

If a future request from the MVPD for an ad matches the updated ADI for the creative, the ad can be served in real time. That is, the ad has been encoded and is available in both ad repository 182 and in the system of broadcast cable provider 105, so can be served in real time.

FIG. 3 shows an example AMS placement request from a broadcast cable provider for ad insertion into a program, in ad definition interface (ADI) format. The file lists ad provider 316, ad creation date 326, and related metadata, such as the provider identity and asset identity.

FIG. 4A and FIG. 4B show an example metadata file in ADI format for a creative asset 404. The asset metadata file includes the asset name 414 and asset ID 425, and lists the features of the creative, including that the ad is available in both HD and SD formats 428, and was created by CCH Creative 446, ad creation agency. The ad has a G rating 434 and is in the field of help and services 456.

Figure 5A:
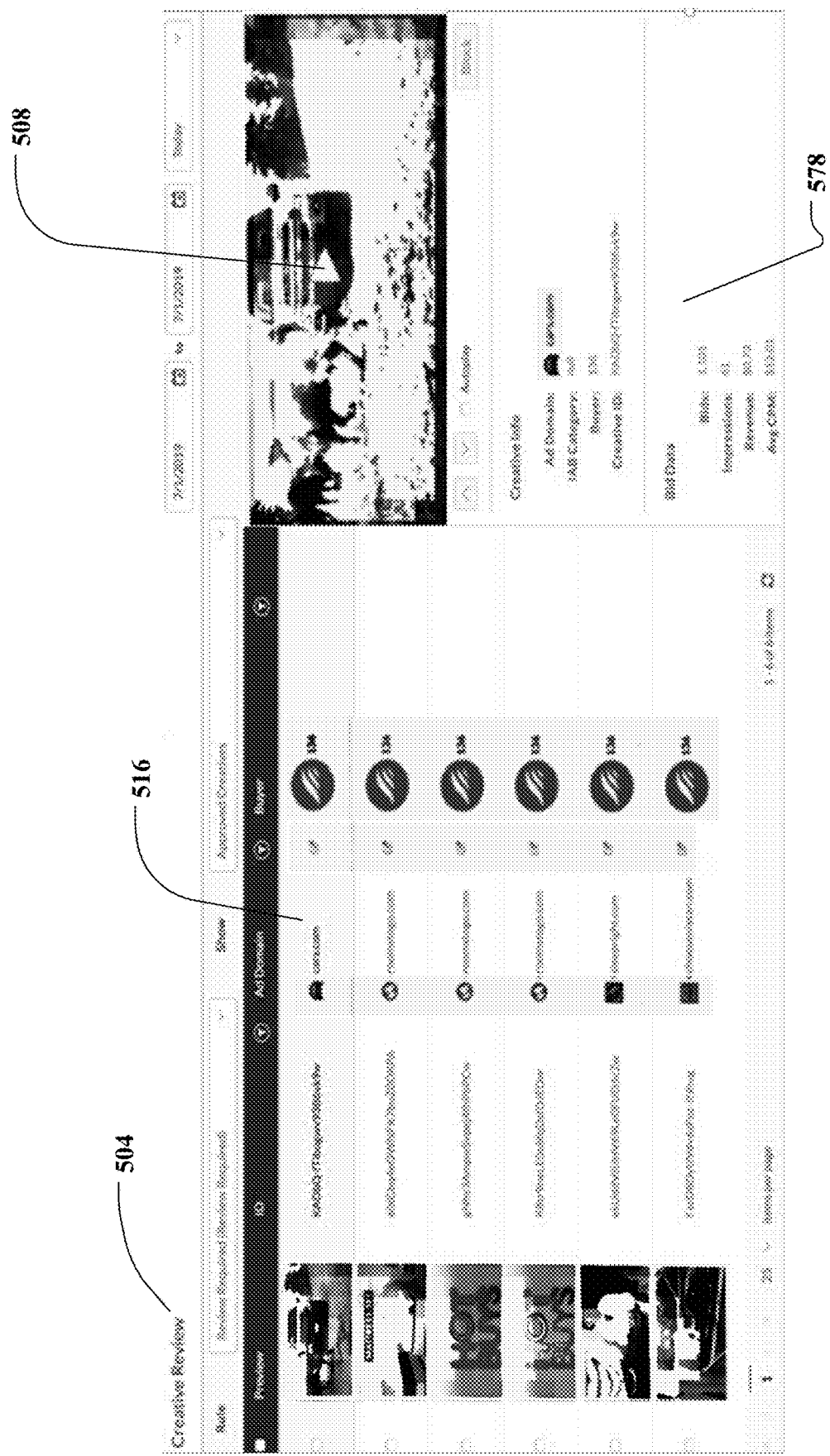
FIG. 5A and FIG. 5B show example user interface screens for creative review of encoded content.
Figure 5B:
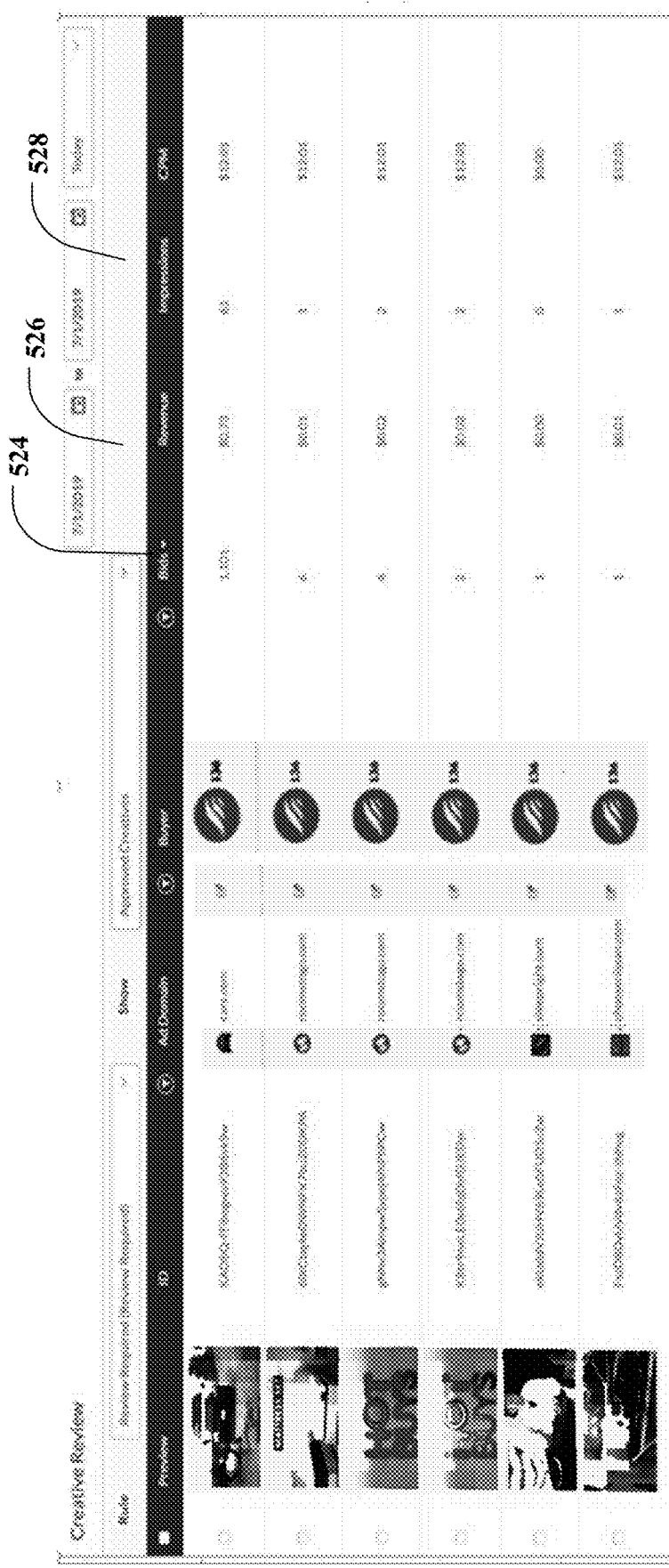
Figure 6:
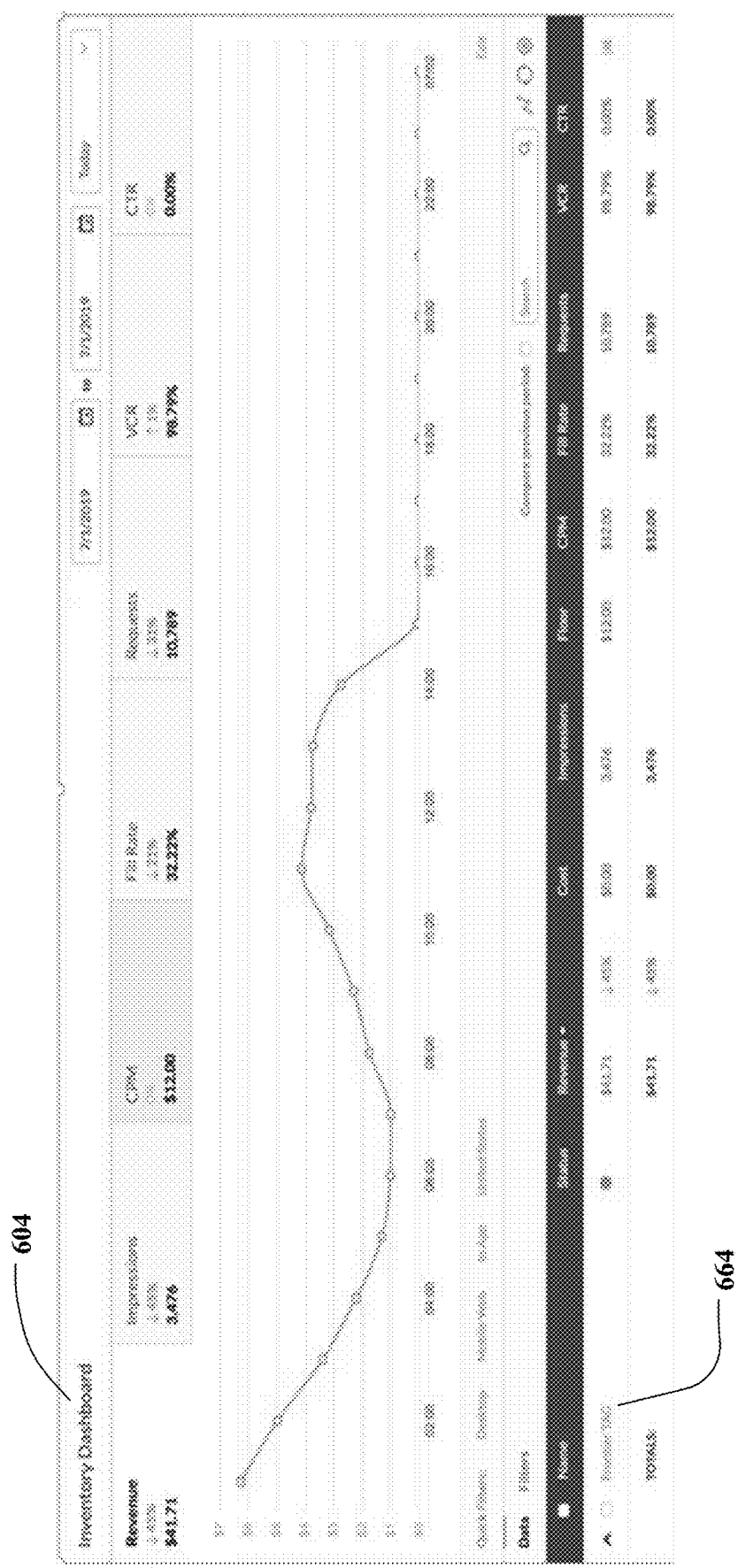
FIG. 6 illustrates inventory dashboard, which shows revenue for a specific MVPD over a twenty-four hour period.

A user interface for viewing previews in a creative review system is included for the disclosed technology. FIG. 5A and FIG. 5B show example user interface screens for creative review 504 of encoded content. An administrator for ad provider 148 or a representative of broadcast cable provider 105 can check for new creatives and select for viewing and can block or unblock creatives, within two minutes of the ad being provided by ad provider 148. The example creative review screen lists an ad for cars.com 516, with an option of playing the selected ad 508. Creative info and bid data 578 summarize the ad as offered. Creative review screens feature additional information for the approved creatives, including bids 524, revenue 526 and impressions 528, as shown in FIG. 5B. FIG. 6 illustrates inventory dashboard 604 that shows revenue for MVPD Frontier 664 over a twenty-four hour period. The dashboard allows viewers to see near real-time performance of their inventory.

In a first use case, ad content is determined in response to a placement request from the MVPD. A viewer selects entertainment and a placement request and campaign management delegate system 112 receives the request, conducts real time bidding for ad insertion during the program, accepts new ad content provided by a successful bidder, formats and uploads the new content in time for playback with the entertainment content. The described process for real time programmatic placement can be completed within one minute. Most real time programmatic placements occur within three minutes, with five to ten minutes possibly required for uploading higher resolution, larger video files—such as a rare, very long ad with a length of 45 seconds to a minute. Any of these times is substantially shorter than what is required for existing systems.

In a second use case, ad content is received and prepared by campaign management delegate system 112 from a prospective bidder, in anticipation of the prospective bidding on a placement request from a broadcast cable provider. When a placement request is received from the broadcast cable provider, campaign management delegate system 112 conducts real time bidding for ad insertion during a program described in the placement request, identifies the prospective bidder as successful and automatically uploads the bidder's new content to the broadcast cable provider.

In a third use case, ad content is received, prepared and uploaded by campaign management delegate system 112 from a prospective bidder, in anticipation of the prospective bidding on a placement request from a broadcast cable provider. Campaign management delegate system 112 responds to a received placement request from the broadcast cable provider by conducting real time bidding for ad insertion and identifies a successful bidder, and sends a placement response that includes reference to the new content from the bidder.

Figure 7:
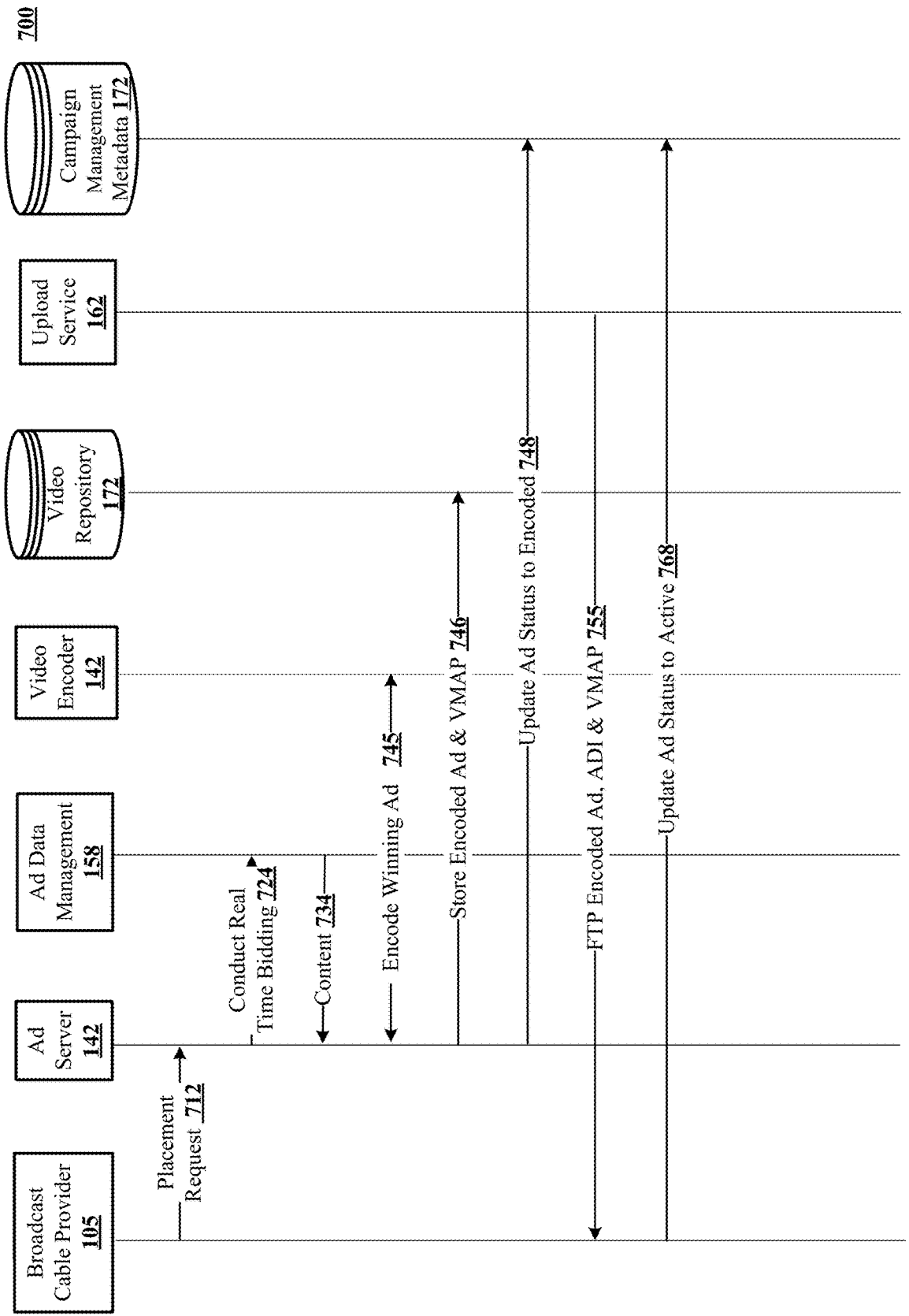
FIG. 7 shows an example of the workflow for streamlining use of Society of Cable Telecommunications Engineers (SCTE) 130 framework for delivery of addressable advertising.

FIG. 7 shows an example of the workflow for streamlining use of Society of Cable Telecommunications Engineers (SCTE) 130 framework for delivery of addressable advertising for use case one. Broadcast cable provider 105 pushes a placement request 712 when a viewer selects a VOD program. Ad server 142 conducts real time bidding 724 for ad insertion during the entertainment selected by the viewer. Ad data management 158 returns the successful creative content 734 to ad server 152 that accepts the new content provided by the successful bidder, and sends the winning ad for encoding 745 to video encoder 142 that automatically formats the new content and then stores the encoded ad 746 in video repository 172 and updates the status of the encoded winning ad 748 to "encoded" in campaign management metadata 172. Upload service 162 uploads the new content to the broadcast cable provider's Content Information Service (CIS), pushing the placement response that includes reference to the new content—sending the encoded ad, ADI and VMAP via FTP 755 to broadcast cable provider 105. Broadcast cable provider 105 ingests the ad and updates the ad status to active 768 in campaign management metadata 172. The message map shows steps for creative review and caching in real time.

FIG. 9A-9E list an example video multiple ad playlist (VMAP) of video ad serving templates (VAST). VMAP 904 includes multiple VASTs called out in line 5 914 for ad ID "21252" and code line 86 943 for ad ID "21242". Information is included in the VMAP for the creatives, including duration of a creative 964. Lines 53 and 57 specify resolutions associated with assets 968. Lines 69 and 76 specify time offsets 938 associated with ad breaks.

Computer System

Figure 8:
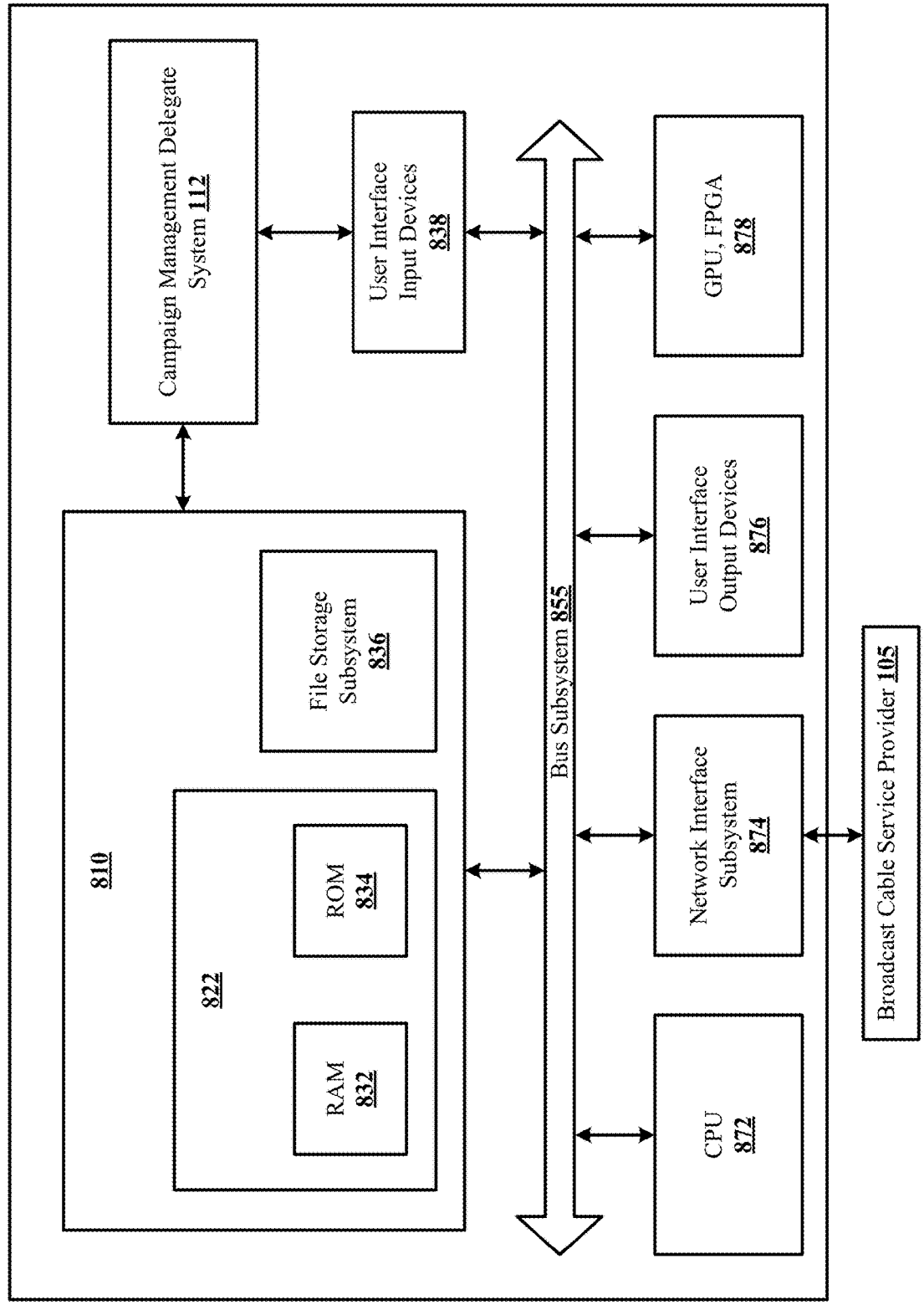
FIG. 8 illustrates a simplified block diagram of a computer system that can be used for streamlining use of the SCTE 130 framework for delivery of addressable advertising, according to one embodiment of the disclosed technology.

FIG. 8 is a simplified block diagram of a computer system 800 that can be used for streamlining use of Society of Cable Telecommunications Engineers (SCTE) 130 framework for delivery of addressable advertising. Computer system 800 includes at least one central processing unit (CPU) 872 that communicates with a number of peripheral devices via bus subsystem 855, for providing real time addressable advertising services described herein. These peripheral devices can include a storage subsystem 810 including, for example, memory devices and a file storage subsystem 836, user interface input devices 838, user interface output devices 876, and a network interface subsystem 874 that connects to broadcast cable provider 105. The input and output devices allow user interaction with computer system 800. Network interface subsystem 874 provides an interface to outside networks, including an interface to corresponding interface devices in other computer systems.

In one implementation, campaign management delegate system 112 of FIG. 1 is communicably linked to the storage subsystem 810 and the user interface input devices 838.

User interface input devices 838 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 800.

User interface output devices 876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 810 stores programming and data constructs that provide the functionality of some or all of the modules and methods described herein. Subsystem 878 can be graphics processing units (GPUs) or field-programmable gate arrays (FPGAs).

Memory subsystem 822 used in the storage subsystem 810 can include a number of memories including a main random access memory (RAM) 832 for storage of instructions and data during program execution and a read only memory (ROM) 834 in which fixed instructions are stored. A file storage subsystem 836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 810, or in other machines accessible by the processor.

Bus subsystem 855 provides a mechanism for letting the various components and subsystems of computer system 800 communicate with each other as intended. Although bus subsystem 855 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 800 depicted in FIG. 8 is intended only as a specific example for purposes of illustrating the preferred embodiments of the present invention. Many other configurations of computer system 800 are possible having more or less components than the computer system depicted in FIG. 8.

Particular Implementations

Some particular implementations and features for streamlining use of Society of Cable Telecommunications Engineers (SCTE) 130 framework for delivery of addressable advertising are described in the following discussion.

In one disclosed implementation, a tangible non-transitory computer readable storage media loaded with program instructions that, when executed on one or more processors, are configurable as a campaign management delegate system that carries out a method, including receiving an ad management service (AMS) placement request from a broadcast cable provider for ad insertion into a program. The method also includes conducting real time bidding for ad insertion during the program and accepting new content provided by a successful bidder, after receiving the placement request, automatically formatting the new content, and uploading the new content to the broadcast cable provider in time for playback with entertainment content that prompted the placement request. The method further includes responding to the placement request with a placement response that includes reference to the new content.

The system described in this section and other sections of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this method can readily be combined with sets of base features identified as implementations.

For some implementations of the method, the new content is uploaded to a Content Information Service (CIS) managed by the broadcast cable provider. For other implementations, the new content is uploaded to a Content Information Service (CIS) provided on behalf of the broadcast cable provider. In one disclosed implementation of tangible non-transitory computer readable storage media, the new content is uploaded to the broadcast cable provider within three minutes after receipt of the placement request. In another implementation, the new content is uploaded to the broadcast cable provider within ten minutes after receipt of the placement request.

For some implementations of the method, the placement request includes ad definition interface (ADI) metadata for the program. In some implementations, the placement response includes a video multiple ad playlist (VMAP) of video ad serving templates (VAST) for the new content. Some implementations further include storing the new content and the VMAP for the new content. The program can be video on demand (VOD) or regularly scheduled programming.

For some implementations of the method, the upload occurs between the receipt of the placement request and a slot in the placement response at which the new content is scheduled to play.

In one disclosed implementation of the method, the real time bidding is achieved using a programmatic auction.

In one disclosed implementation of the method, the entertainment content is video on demand (VOD). In another implementation of the disclosed method, the entertainment content is regularly scheduled programming.

In another implementation, a tangible non-transitory computer readable storage media loaded with program instructions that, when executed on one or more processors, are configurable as a campaign management delegate system that carries out a method, including accepting new content from a prospective bidder for ad placement, automatically formatting the new content and readying it for upload to a broadcast cable provider, in anticipation of the prospective bidder bidding on a placement request from the broadcast cable provider, and receiving the placement request from the broadcast cable provider. The disclosed method also includes conducting real time bidding for ad insertion during a program described in the placement request, identifying the prospective bidder as successful, and automatically uploading the successful prospective bidder's new content to the broadcast cable provider's CIS in time for playback with the program that prompted the placement request. The method further includes responding to the placement request with a placement response that includes reference to the new content from the prospective bidder.

In yet another implementation of the disclosed technology, a tangible non-transitory computer readable storage media is loaded with program instructions that, when executed on one or more processors, are configurable as a campaign management delegate system that carries out a method that includes accepting new content from a prospective bidder for ad placement, automatically formatting the new content, readying it for upload and uploading it to a broadcast cable provider, in anticipation of the prospective bidder bidding on a placement request from the broadcast cable provider. The method also includes receiving the placement request from the broadcast cable provider, conducting real time bidding for ad insertion during a program described in the placement request, identifying the prospective bidder as successful, and responding to the placement request with a placement response that includes reference to the new content from the prospective bidder.

Other implementations of the disclosed technology described in this section include a method that includes executing the computer instructions from the non-transitory computer readable storage media on the one or more processors. Yet another implementation of the disclosed technology described in this section can include a computer implemented system including a processor, memory coupled to the processor and the computer instructions from the non-transitory computer readable storage media loaded into the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A tangible non-transitory computer readable storage media loaded with program instructions that, when executed on one or more processors, are configurable as a campaign management delegate system that carries out a method, including:
   receiving an ad management service (abbreviated AMS) placement request from a broadcast cable provider for ad insertion into a program;
   conducting real time bidding during the program for ad insertion;
   accepting new content provided by a successful bidder, after receiving the real time bidding, automatically formatting the new content, and uploading the new content to the broadcast cable provider in time for playback with entertainment content that prompted the placement request; and
   responding to the placement request with a placement response that includes reference to the new content.

2. The tangible non-transitory computer readable storage media of claim 1, wherein the new content is uploaded to a Content Information Service (abbreviated CIS) managed by the broadcast cable provider.

3. The tangible non-transitory computer readable storage media of claim 1, wherein the new content is uploaded to a Content Information Service (abbreviated CIS) provided on behalf of the broadcast cable provider.

4. The tangible non-transitory computer readable storage media of claim 1, wherein the new content is uploaded to the broadcast cable provider within ten minutes after receipt of the placement request.

5. The tangible non-transitory computer readable storage media of claim 1, wherein the upload occurs between receipt of the placement request and a slot in the placement response at which the new content is scheduled to play.

6. The tangible non-transitory computer readable storage media of claim 1, wherein the placement response includes a video multiple ad playlist (abbreviated VMAP) of video ad serving templates (abbreviated VAST) for the new content.

7. The tangible non-transitory computer readable storage media of claim 1, wherein the entertainment content is video on demand (abbreviated VOD).

8. The tangible non-transitory computer readable storage media of claim 1, wherein the entertainment content is regularly scheduled programming.

9. A method including:
   receiving an ad management service (abbreviated AMS) placement request from a broadcast cable provider for ad insertion into a program;

conducting real time bidding during the program for ad insertion;

accepting new content provided by a successful bidder, after receiving the real time bidding, automatically formatting the new content, and uploading the new content to the broadcast cable provider in time for playback with entertainment content that prompted the placement request; and responding to the placement request with a placement response that includes reference to the new content.

10. A tangible non-transitory computer readable storage media loaded with program instructions that, when executed on one or more processors, are configurable as a campaign management delegate system that carries out a method, including:

accepting new content from a prospective bidder for ad placement;

automatically formatting the new content and readying it for upload to a broadcast cable provider, in anticipation of the prospective bidder bidding on a placement request from the broadcast cable provider;

receiving the placement request from the broadcast cable provider;

conducting real time bidding during a program for ad insertion described in the placement request;

identifying the prospective bidder as successful;

automatically uploading after the real time bidding the successful prospective bidder's new content to the broadcast cable provider in time for playback with entertainment content that prompted the placement request; and responding to the placement request with a placement response that includes reference to the new content from the prospective bidder.

11. The tangible non-transitory computer readable storage media of claim 10, wherein the new content is uploaded to a Content Information Service (abbreviated CIS) managed by the broadcast cable provider.

12. The tangible non-transitory computer readable storage media of claim 10, wherein the new content is uploaded to a Content Information Service (abbreviated CIS) provided on behalf of the broadcast cable provider.

13. The tangible non-transitory computer readable storage media of claim 10, wherein the new content is uploaded to the broadcast cable provider within three minutes after receipt of the placement request.

14. The tangible non-transitory computer readable storage media of claim 10, wherein the upload occurs between receipt of the placement request and a slot in the placement response at which the new content is scheduled to play.

15. The tangible non-transitory computer readable storage media of claim 10, wherein the placement response includes a video multiple ad playlist (abbreviated VMAP) of video ad serving templates (abbreviated VAST) for the new content.

16. The tangible non-transitory computer readable storage media of claim 10, wherein the entertainment content is video on demand (abbreviated VOD).

17. The tangible non-transitory computer readable storage media of claim 10, wherein the entertainment content is regularly scheduled programming.

18. A method including:

accepting new content from a prospective bidder for ad placement;

automatically formatting the new content and readying it for upload to a broadcast cable provider, in anticipation of the prospective bidder bidding on a placement request from the broadcast cable provider;

receiving the placement request from the broadcast cable provider;

conducting real time bidding during a program for ad insertion described in the placement request;

identifying the prospective bidder as successful;

automatically uploading after the real time bidding the successful prospective bidder's new content to the broadcast cable provider in time for playback with entertainment content that prompted the placement request; and responding to the placement request with a placement response that includes reference to the new content from the prospective bidder.

19. A tangible non-transitory computer readable storage media loaded with program instructions that, when executed on one or more processors, are configurable as a campaign management delegate system that carries out a method, including:

accepting new content from a prospective bidder for ad placement;

automatically formatting the new content, readying it for upload and uploading it to a broadcast cable provider, in anticipation of the prospective bidder bidding on a placement request from the broadcast cable provider;

receiving the placement request from the broadcast cable provider;

conducting real time bidding during a program described in the placement request for ad insertion;

identifying the prospective bidder as successful; and responding to the placement request with a placement response that includes reference to the new content from the prospective bidder;

wherein the placement response includes a video multiple ad playlist (abbreviated VMAP) of video ad serving templates (abbreviated VAST) for the new content.

* * * * *